(12) United States Patent
Kuderer

(10) Patent No.: US 6,326,603 B1
(45) Date of Patent: Dec. 4, 2001

(54) CHARGE BALANCE TYPE PHOTODIODE ARRAY COMPRISING A COMPENSATION CIRCUIT

(75) Inventor: Hubert Kuderer, Waldbronn (DE)

(73) Assignee: Agilent Technologies, Inc., Loveland, CO (US)

( * ) Notice: Subject to any disclaimer, the term of this patent is extended or adjusted under 35 U.S.C. 154(b) by 0 days.

(21) Appl. No.: 09/392,281

(22) Filed: Sep. 9, 1999

(30) Foreign Application Priority Data

Sep. 10, 1998 (EP) .................................................. 98117109

(51) Int. Cl.⁷ .................................................... H01J 40/14
(52) U.S. Cl. ................................... 250/208.2; 250/214 C; 250/214 R; 327/515
(58) Field of Search .............................. 250/208.2, 208.4, 250/214 R, 214 A, 214 LA, 214 LS, 214 C, 214 DC, 226; 327/514, 515; 356/218

(56) References Cited

U.S. PATENT DOCUMENTS

| 4,580,103 | 4/1986 | Tompsett . |
| 5,796,361 | 8/1998 | Levinson . |
| 6,194,703 | * 2/2001 | Kuderer ........................ 250/214 R |

FOREIGN PATENT DOCUMENTS

| 0 519 105 | 12/1992 | (EP) . |
| 0 773 669 | 5/1997 | (EP) . |

OTHER PUBLICATIONS

"Dynamic Offset Null" by W.J. Martin and M.J. Steinmetz, as appeared in IBM Technical Disclosure Bulletin, vol. 23 No. 9, Feb. 1981, 2 pp.

* cited by examiner

Primary Examiner—John R. Lee
Assistant Examiner—Kevin Pyo

(57) ABSTRACT

In order to improve the noise performance of a charge balance type photodiode array by reducing error influences, e.g. due to offset voltages, flicker and/or thermal noise, on a desired signal a compensation circuit is inserted in each channel of this array. The basic concept under lying this compensation circuit is to effect a correlated double sampling method without any significant increase in space or power demand for the silicon chip of at least one channel of said photodiode array. Because the wanted signal is primarily an amount of charge, the compensating circuit comprises a switchable compensating capacitor to compensate an error contribution of the desired signal. In a first "calibration period" the compensating capacitor is charged or discharged in dependence on the actual noise contribution. In a second compensation period the compensation capacitor provides a voltage which is used to correct a predetermined reference voltage to insure compensation of the error contribution. These periods are synchronized to the charge balance technique used in connection with the photodiode array.

7 Claims, 2 Drawing Sheets

CHARGE BALANCE TYPE PHOTODIODE ARRAY COMPRISING A COMPENSATION CIRCUIT

BACKGROUND OF THE INVENTION

The invention concerns a photodiode array having a plurality of channel. Such a photodiode array is used, for example, for measuring the absorption spectrum of a sample substance to derive information concerning the chemical composition of the sample and the quantities of individual constituents in the sample.

A photodiode array of this kind is known in the art through European patent EP 0 519 105 B1. This conventional photodiode array can be used in a liquid chromatograph for analyzing the substances eluting from the chromatographic column. It comprises a light source emitting a broad spectrum of ultraviolet and visible radiation and an optical system for focussing the beam onto a sample cell through which the sample substances to be analyzed flow. Depending on the specific substances flowing through the cell, the sample absorbs certain characteristic spectral portions of the radiation entering the sample cell so that the spectral composition of the radiation leaving the cell is indicative of the sample substances.

In such a spectrometer, the spectrum of the radiation leaving the sample cell is extracted using a diffraction grating disposed in the optical path behind the cell. The diffraction grating directs light rays of differing wavelengths into different directions. A linear photodiode array is disposed to receive the light diffracted by the grating. Each diode thereby receives light corresponding to a different wavelength range. The electrical signals produced in each photodiode by the impinging light are read out by a read-out circuit and converted to digital data values representative of the intensity of the light incident on the respective diode. These data values are then displayed as a function of wavelength in any convenient form, for example on a CRT screen.

The photodiode array is a semiconductor device and comprises a plurality of photosensitive elements connected via electronic switches to a common output line, e.g. a video line, which in turn is connected to a charge amplifier. Each photosensitive element has an associated capacitor representing the junction capacitance of the photodiodes. The combination of a photosensitive element and associated capacitor is also referred to as a "photocell".

Light impinging on the photosensitive material generates charge carriers discharging these capacitors. The capacitors of the photocells are initially charged to a predetermined value and are discharged by the photocurrent generated by the photocells when light impinges thereon. The amount of charge needed to recharge the capacitors to their original values causes a voltage change at the output of the charge amplifier, a signal indicating the light intensity on the photodiode.

A photodiode array comprises a plurality of photocells, each generating these output signals, which are processed sequentially. The photodiode array usually operates in an integrating mode (self-scanning and random access photodiode arrays). The distribution of the output signals over time is associated with the problem of spectral distortion. In particular, for spectrophotometers used to detect sample substances eluting from the column of a liquid chromatograph, the sample to be analyzed changes as a function of time. Since the signals from the individual photocells are processed sequentially, the output signals caused by light beams of different wavelengths simultaneously impinging on the photodiodes are therefore evaluated in a time distributed fashion.

Another problem is that a single A/D converter is normally used to sequentially convert the signals from individual photodiodes of the photodiode array. Since the number of photodiodes is usually very large, i.e. 1024 photodiodes, the conversion rate of the A/D converter has to be very high, e.g. above 100 kHz, to ensure high measuring accuracy. Such A/D-converters are rather complex and expensive.

A parallel photodiode array architecture is therefore preferred in accordance with EP 0 519 105. The signals from each channel, having its own converter, are simultaneously generated. Simpler A/D converters can be used for each channel and the measuring accuracy of time variable sample concentrations is improved.

The use of a charge balance type of photodiode array is preferred to improve integration of the photodiode array, e.g. onto one single silicon chip. This type of photodiode array uses an integrator circuit to accumulate the charge delivered by the photocurrent and removes the charge accumulated within a predetermined time interval in defined charge packets using a switchable dumping capacitor. The frequency of charge dumps required to keep the system in balance is proportional to the photocurrent generated by the individual photodiode. Each photodiode is connected to the summing node of an integrator, which continuously accumulates the charge corresponding to the photocurrent for effecting the A/D conversion. The output signal of the integrator is periodically compared to a predetermined signal level, i.e. by a suitable comparator and, in response to these comparisons, charge dumps to and/or from the integrator are executed to keep the output signal near a predetermined level. The number of such dumps is counted, i.e. by a logical counter during a predetermined time interval. The number determined is a digital signal representing the actual photocurrent.

This integrator circuit usually comprises an operational amplifier. This causes problems relating to the input offset voltage and the input offset drift of this operational amplifier. The input offset voltage results from the circuit design, random offset, and from mismatches on the silicon chip. Additional problems are caused by noise e.g. so-called flicker noise and thermal noise, associated with the input stage of this operational amplifier. A special problem concerning the noise performance is related to the fact that the noise behavior is not in equipartition over the whole frequency-spectrum. The flicker noise contribution changes as $1/f$-. Therefore the noise contribution is particularly high at lower signal frequencies.

In a preferred embodiment, the charge balance type of photodiode array comprises C-MOS-technology to reduce the voltage gain of the operational amplifier and increase the influence of an input offset voltage.

The flicker noise performance of a MOSFET-circuitry could be improved by increasing the size of the gate area of the MOSFET's. The thermal noise performance mainly depends on the conductance of the input-MOSFET's of the circuitry which, in turn, depends on the ratio of channel width to channel length. In consequence thereof, an enlargement of the gate area is desirable to improve the noise performance, but is associated with increased space and therefore power demand. This is in conflict with attempts to always develop more highly integrated chips.

SUMMARY OF THE INVENTION

It is therefore an object of the invention to improve the measurement accuracy of a charge balance type photodiode array. It is especially an object of the invention to improve the noise performance of a charge balance type photodiode array by avoiding the disadvantages of prior art. The noise performance of the photodiode array should be particular improved with regard to the low frequency characteristics. It is also an object of the invention to suppress or at least to reduce the influence of offset voltages on the desired signal.

The basic principle of the invention is the creation of a photodiode array of the charge balance type which comprises a signal error compensation or at least a noise e.g. a flicker and/or thermal noise reduction by inserting a compensation circuit using a method known as correlated double sampling. The basic idea of this method is to measure and to store, in a first step, the error component of a desired signal and to use, in a second step, this stored value for superposition to compensate this error contribution to the desired signal. With regard to the charge balance type photodiode array there is the problem that the desired signal is not a voltage, rather an amount of charge. This causes the problem of compensating the error contribution without any significant charge movement causing new and other error contributions. The compensating circuit therefore comprises a compensation capacitor charged, in a first step, to a charge amount corresponding to an error voltage caused by the signal error component.

The main advantage of this photodiode array circuit is an enormous improvement in the measurement accuracy without a significant increase in space or power demand.

It is useful if no additional circuits are needed to control the compensating circuit. It is advantageous to synchronize control of the dumping circuit and the compensating circuit. Towards this end, the clear and charge period of the charge balance method are synchronized with the calibration and compensation period of the compensation circuit.

In a preferred embodiment of the invention, the compensating circuit comprises a compensating capacitor connected to three switches. This is sufficient for realizing a calibration of the compensation circuit and the compensation itself. The control of these switches is synchronized with the control of the switches of the dumping circuit.

In an further improvement in this embodiment, the compensating circuit is connected to a non inverting input of an operational amplifier of said integrator circuit. This has the advantage, that a reference voltage, which is usually connected to said non-inverting input, is modified in relation to the actual error contribution to the actual desired signal.

A preferred control algorithm controls the synchronized calibration of the compensation circuit and subsequently of the error compensation.

In a further improved embodiment of the invention, the compensation circuit is self-regulated. This means that the compensation circuit is permanently calibrated. This is important for time changing desired signals, also with regard to time changing noise signals. For example, the thermal noise is usually not constant. It is therefore important to constantly adjust the error-correlated voltage provided by the compensation capacitor. According to the invention, it is sufficient to only modify the charge difference caused by the actual change in error contribution. There is therefore no need to remove significant amounts of charge from the charge balance system, which would cause new error.

In a further improvement in this embodiment, the switches comprise CMOS-technology to facilitate arrangement of the entire photodiode array on one single chip.

BRIEF DESCRIPTION OF THE DRAWING

An embodiment of the invention is described in more detail below with reference to the drawings.

DESCRIPTION OF THE PREFERRED EMBODIMENT

Figure 1:
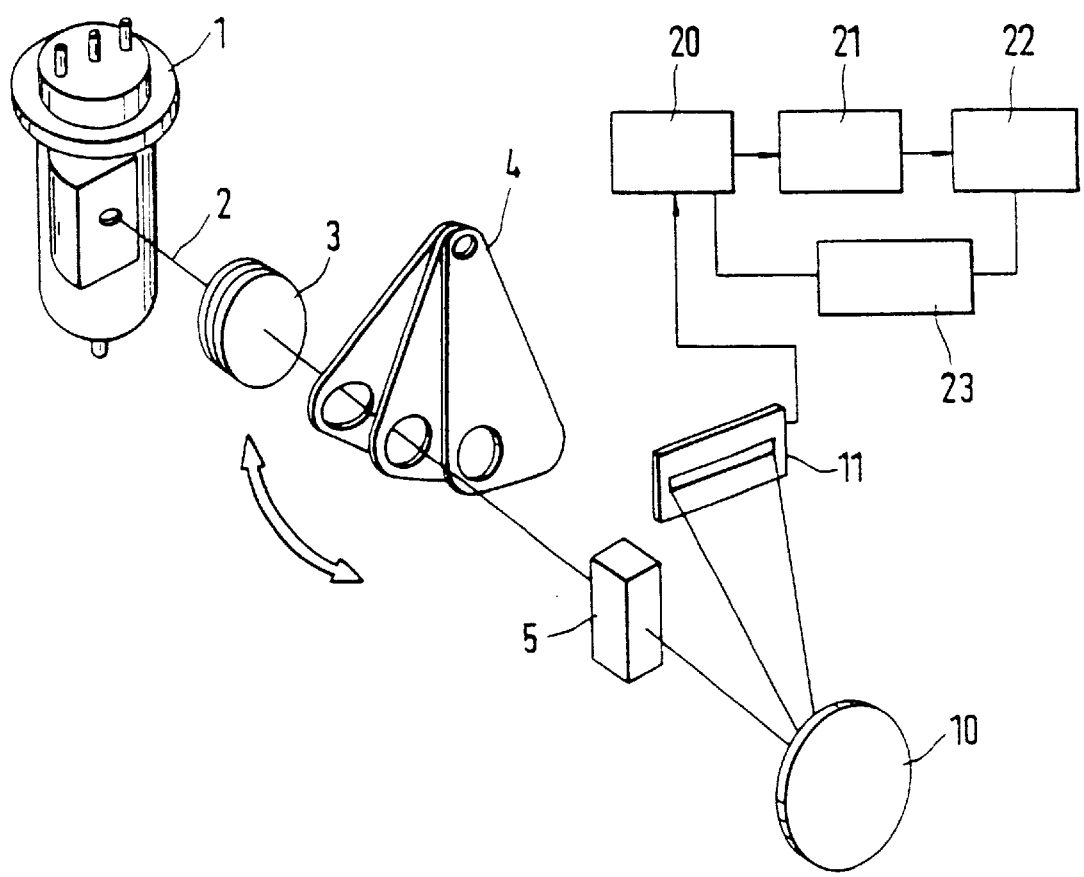
FIG. 1 shows a schematic diagram of a photodiode array spectrometer comprising a photodiode array according to the invention.

FIG. 1 schematically shows a photodiode array for measurement of the absorption of a polychromatic beam of ultraviolet and/or visible radiation by a sample to be analyzed.

The spectrometer comprises a light source 1 e.g. a deuterium lamp which emits a light beam 2 of polychromatic radiation. In accordance with the invention, the light source 1 may also be a flash light type lamp. The light beam 2 is focused by a lens system 3 into a sample cell 5. The lens system 3 is preferably an achromatic system to ensure that rays of different wavelengths have substantially the same focal point. A shutter 4 permits interruption of the light beam 2 for measuring the dark signal at the photodiodes of the photodiode array 11. During the actual measuring process with the beam 2 passing through sample cell 5, the dark signal and other offset signals are subtracted from the measured values to compensate measuring errors.

The sample cell 5 may comprise an inlet and an outlet through which a sample liquid to be analyzed continuously flows. A spectrometer of this kind is used in liquid chromatographs connected to a chromatographic separation column from which sample substances are continuously eluting.

The polychromatic radiation entering the sample cell 5 is partially absorbed by the substance in the cell. Depending on the sample substances, rays of certain wavelengths are more strongly absorbed than rays of other wavelengths. The beam leaving the cell 5 therefore has a different spectral composition than the light beam 2 entering the cell 5. The resulting spectrum thereby contains information about the type and quantity of substances in the cell 5.

The beam leaving the cell 5 impinges on a holographic diffraction grating 10, which disperses the light in dependence on the different wavelengths in the incident beam. The spatially separated light rays from the grating 10 impinge on a photodiode array 11 consisting of a plurality of individual light sensitive diodes separated by light insensitive gaps. Each of the photodiodes captures a specific spectral portion of the diffracted radiation.

The photodiode array 11 is connected to a read out circuit 20 for continuously reading out electrical signals from the photodiodes, these signals being indicative of the intensity of the light signals impinging on the photodiodes. The electrical signals read out from the photodiode array 11 are then further processed in a signal processing unit 21. Operation of the read out circuit 20 and the signal processing unit 21 is controlled by a controller 23 which also controls display means 22 for displaying a spectrum of the analyzed sample.

Figure 2:
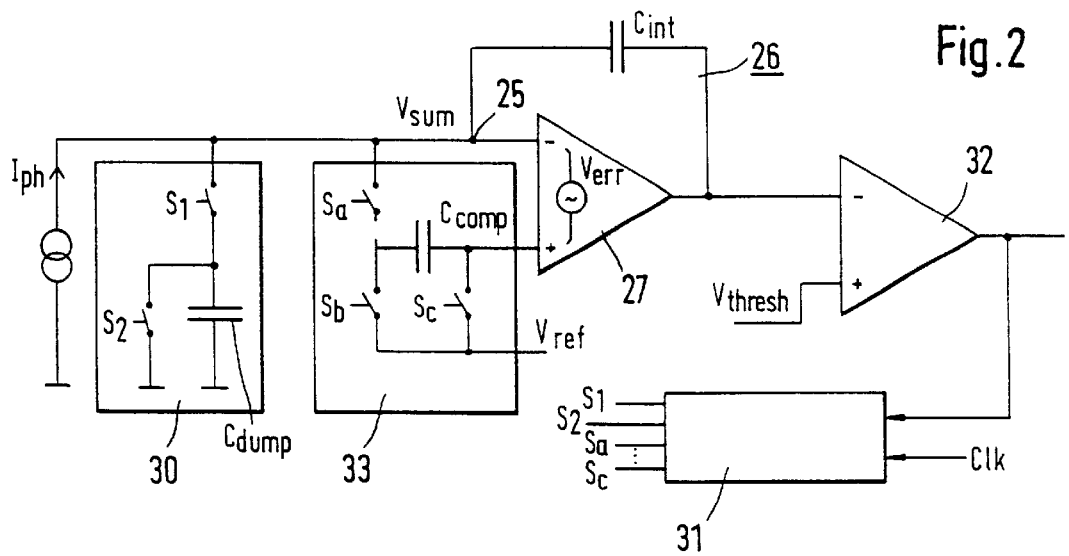
FIG. 2 shows a simplified block diagram illustrating one channel of a charge balance type photodiode array having a compensating circuit.

As shown in FIG. 2, a photodiode is reverse biased and acts as a current source, providing a photocurrent $I_{ph}$. The photocurrent $I_{ph}$ flows when light impinges on the photodiodes and has a value proportional to the incident light level. The photodiode is connected to a summing node 25 of an integrator circuit 26 comprising an operational amplifier 27 and a capacitor $C_{int}$ in its feedback loop. The bias voltage of the photodiode is given by the voltage $V_{sum}$ provided by the inverting input of the operational amplifier 27. A dumping circuit 30 comprises a switchable dumping capacitor $C_d$ controlled by a logic circuit 31. A comparator circuit 32 is connected between the output of the integrator circuit 26 and the logic circuit 31. The charge dumps of the dumping capacitor $C_d$ needed to keep the system in balance are counted by a digital counter (not shown). The digital output signal of the counter indicates the light intensity impinging on the photodiode. The above-described type of photodiode array 11 is called a "charge balance type".

The embodiment of the invention described below additionally comprises a compensation circuit 33 connected to the summing node 25 of the integrator circuit 26. This compensation circuit 33 comprises a switchable compensation capacitor $C_{comp}$. The compensation capacitor $C_{comp}$ is switchable via an arrangement of three switches $S_a$, $S_b$ and $S_c$. In a preferred embodiment, the switches $S_a$, $S_b$ and $S_c$ also comprise suitable MOSFET's. The entire photodiode array 11 can therefore be effected as one silicon chip, integrated to as high an extent as possible.

Due to the use of an operational amplifier 27, also effected in CMOS technology, the wanted signal is disturbed by offset and noise components resulting from the chip design or unavoidable tolerances or drift effects. MOS-devices are particularly influenced by offset voltages as well as by flicker and thermal noise.

Figure 3:
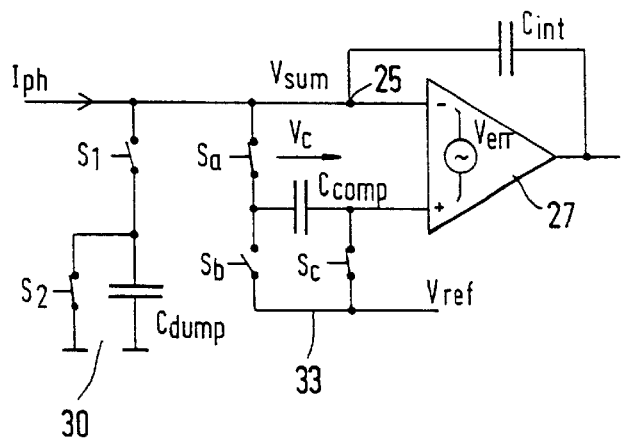
FIG. 3 shows a detail of the compensating circuit during a so-called "calibration period" and FIG. 4 shows a detail of the compensating circuit during a so-called "compensation period".
Figure 4:
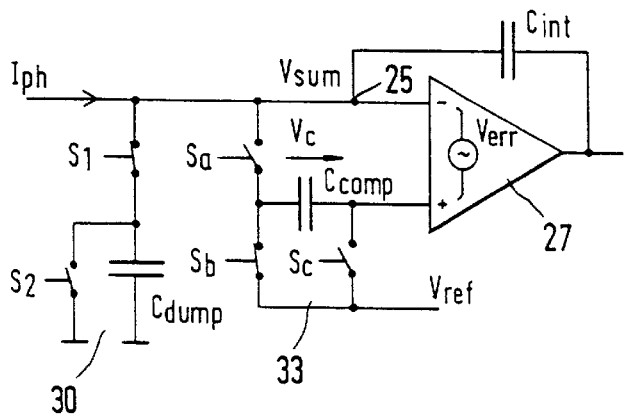

The compensation circuit 33 permits compensation of the undesired signal errors using a correlated double sampling method, which can be seen in connection with the FIGS. 3 and 4, illustrating the two double sampling method steps:

1. calibration, and
2. compensation

These two steps are synchronized with the two steps of the charge balance method, the so-called clear and charge phases, as will be seen below.

The whole process is superimposed by a photocurrent $I_{ph}$ permanently flowing into $C_{int}$. This causes a permanent integration by the integrator circuit 26. In a first step, the so-called "clear phase", the dumping capacitor $C_{dump}$ is discharged via the closed switch $S_1$, as seen in FIG. 3. The designation "clear phase" means the clearing of the capacitor $C_{dump}$. Within this phase, the switch Sa is closed as is the switch Sc. The voltage $V_c$ across the compensation capacitor $C_{comp}$ is therefore in series with the reference voltage $V_{ref}$ at the non-inverting input of the operational amplifier 27. This means that the compensation capacitor $C_{comp}$ is charged until it reaches a charge amount providing exactly the voltage difference between $V_{sum}$ and $V_{ref}$. In order to ensure calibration of the photodiode array 11, the reference voltage $V_{ref}$ is equal to a desired signal. The difference voltage $V_c$ delivered by the compensation capacitor $C_{comp}$ is therefore equivalent to an error voltage caused by the offset and noise signal error components. The compensation circuit 33 is now calibrated. The calibration step is therefore equivalent to the clear phase.

The compensation step, equivalent to the charge phase of the charge balance method, then follows to ensure a measurement with improved measurement quality and/or accuracy.

During this so-called charge phase, the dumping capacitor is charged to an amount corresponding to summing voltage $V_{sum}$ by closing switch $S_1$ and opening switch $S_2$. As described above, the number of charge dumps needed therefor is a measure of the light impinging on the photodiode array.

At this time the amount $V_{sum}$ is corrected, since, within the compensation circuit 33, the switches $S_a$ and $S_c$ are opened, while switch $S_b$ is closed. The summing voltage $V_{sum}$ thereby results as given by the following equation:

$$V_{sum} = V_{ref} - V_c$$

This means that the reference voltage $V_{ref}$ is calibrated by the compensation voltage $V_c$, whereby the compensation voltage $V_c$ corresponds to the error contribution to the desired signal. A compensated voltage $V_{sum}$ is therefore used in the charge balance method to achieve a digitized amount corresponding to the light intensity impinging on the photodiode array. The error contribution is successfully compensated for.

A new clear phase with a new calibration period for the compensating circuit then begins. It is thereby sufficient to change the charge of the compensation capacitor only by a differential amount corresponding to the signal change e.g. an error contribution change. This is the case, since there is no need for any significant charge movement in the active measurement system. There are therefore no additional errors caused by the voltage/charge transfer relating to the error-voltage contribution compensation within a charge balance system.

In consequence thereof, the charge balance is always nearly perfectly error compensated. Only for a first occurrence of signal change is a small uncompensated error contribution possible, since the compensating circuit 33 must be re-calibrated to suitably modify the reference voltage $V_{ref}$. This means that the error compensation according to the invention is particularly efficient in the lower frequency range, since the signal change is reduced in this range. This is in fact an important advantage of the invention, since a significant error component of the flicker noise is 1/f-noise. There is therefore a need for particular error compensation, e.g. noise reduction, in the low frequency range.

The above-described method facilitates compensation of thermal and flicker noise as well as offset voltages without any increased space or energy demand.

In view of time varying desired signals and drift effects, it is necessary to continuously calibrate the compensation circuit 33. It is thereby not possible to avoid imperfect compensation at a first instant of signal change. A calculation of the expected error contribution indicates an improvement of orders of magnitude.

A charge balance photodiode array is disclosed having an enormously improved measurement accuracy without a remarkable increase in manufacturing costs.

What is claimed is:

1. A photodiode array having a plurality of channels, each channel comprising:

a photodiode which is reverse biased such that it acts as a current source and which provides an electrical output signal in response to the light impinging on said photodiode, a signal processing unit for processing said electrical output signal of the photodiode, an A/D conversion circuit for providing a digital output signal indicative of the intensity of light impinging on said photodiode, which comprises an integrator circuit for accumulating charge corresponding to the photocurrent provided by the photodiode, a controllable dumping circuit for dumping predefined charge packets to and/or from the integrator circuit, a comparator circuit for comparing the output signal of the integrator circuit with a predetermined signal, a logic circuit, connected to the output of said comparator circuit and to a control input of said dumping circuit for controlling said charge flow to keep the output signal of the comparator circuit within a predetermined range about the predetermined signal a digital counter for counting the number of charge packets to or from the integrator circuit during a predetermined time interval, characterized in that a compensating circuit is inserted at the input side of said integrator circuit, comprising at least a switchable compensation capacitor, whereby said compensation capacitor is, in a first step, charged to a compensating-voltage corresponding to an error voltage caused by changed signal noise, which is subsequently superimposed onto the input signal of the integrator circuit to compensate said noise component of a desired signal input.

2. Photodiode array as in claim 1, characterized in that the compensation circuit is in controlled connection with said dumping circuit.

3. Photodiode array as in claim 2, characterized in that the compensation circuit comprises at least the compensation capacitor, which is switchable by at least three switches, operated in connection with the dumping circuit.

4. Photodiode array as in claim 3, characterized in that the compensating circuit is connected to the non-inverting input of an operational amplifier of said integrator circuit.

5. Photodiode array as in claim 4, characterized in that said compensation circuit is controlled in such that, in a first so called "calibration period", the compensation capacitor is inserted between a voltage at a summing node of said integrator circuit and said predetermined signal to charge the compensating circuit to a predetermined voltage corresponding to the noise component, and that, in a second so called "compensation period", the non-inverting input of said integrator circuit is directly connected to the compensation capacitor-voltage.

6. Photodiode array as in claim 5, characterized in that the compensation capacitor voltage is self-regulated during the entire measurement cycle.

7. Photodiode array as in claim 1, characterized in that said switchable compensation capacitor is switched by a MOSFET switch.

* * * * *